United States Patent [19]
Nishimura et al.

[11] Patent Number: 5,592,253
[45] Date of Patent: Jan. 7, 1997

[54] LOCK DEVICE OF CARTRIDGE CHAMBER DOOR OF CAMERA

[75] Inventors: Tomoki Nishimura, Kawasaki; Noboru Akami, Yokohama, both of Japan

[73] Assignee: Nikon Corporation, Tokyo, Japan

[21] Appl. No.: 515,568

[22] Filed: Aug. 16, 1995

[30] Foreign Application Priority Data

Sep. 16, 1994 [JP] Japan .................................. 6-221613

[51] Int. Cl.⁶ .................................................. G03B 17/26
[52] U.S. Cl. ........................................... 396/538; 396/513
[58] Field of Search .................................. 354/174, 275, 354/277, 288

[56] References Cited

U.S. PATENT DOCUMENTS

| | | | |
|---|---|---|---|
| 5,430,515 | 7/1995 | Lawther et al. | 354/275 |
| 5,477,295 | 12/1995 | Lawther et al. | 354/275 |
| 5,481,325 | 1/1996 | Wada et al. | 354/288 |

FOREIGN PATENT DOCUMENTS

| | | |
|---|---|---|
| 1191836 | 8/1989 | Japan . |
| 5150344 | 6/1993 | Japan . |

Primary Examiner—A. A. Mathews

[57] ABSTRACT

A lock device of a camera using a film cartridge having a light-shielding door shiftable between a light-shielding condition for shielding light to a photographic film in the film cartridge and a non-light-shielding condition for enabling the photographic film to be withdrawn from the film cartridge, the lock device comprises a cartridge chamber having an opening portion through which the film cartridge is loaded in the cartridge chamber, a cartridge chamber door being disposed in a shielding position for shielding the opening portion of the cartridge chamber when the light-shielding door of the film cartridge is at least in the non-light-shielding condition, a holding member shiftable between a prohibited position for prohibiting movement of the cartridge chamber door from the shielding position and an allowed position for allowing movement of the cartridge chamber door from the shielding position, and a limiting member for limiting movement of the holding member from the prohibited position to the allowed position.

5 Claims, 12 Drawing Sheets

LOCK DEVICE OF CARTRIDGE CHAMBER DOOR OF CAMERA

BACKGROUND OF THE INVENTION

1. Field of the Invention

The present invention relates to, in a camera using a film cartridge having a light-shielding door (light lock door) at its lead portion, a lock device of a cartridge chamber door for preventing the cartridge chamber door from being opened accidentally while a film is loaded in the camera.

2. Related Background Art

As shown in FIG. 1, there is a film cartridge 1 having a light-shielding door 1c at a lead portion thereof. When a film is contained in the film cartridge 1 in a roll, the light-shielding door 1c is closed to prevent the film from being exposed. After the film cartridge 1 is loaded in a camera, the light-shielding door 1c is opened to advance the film to the inside of the camera. At that time, in order to prevent the film from being exposed, an opening portion of a cartridge chamber is provided with a cartridge chamber door 3.

There are cases where although the film is loaded in the camera, the cartridge chamber door for taking out the film cartridge is carelessly opened to expose the film after photographing.

SUMMARY OF THE INVENTION

It is an object of the present invention to provide a look device of a camera capable of preventing a loaded photographic film from being exposed erroneously.

In order to solve the above object, a lock device of a camera of the present invention has a limiting member interlocked with the opening and closing of a light-shielding door of a film cartridge so as to limit the opening of a cartridge chamber door of the camera while the light-shielding door of the film cartridge is opened.

According to the lock device of the camera of the present invention, the limiting member for limited movement of a holding member for limiting the opening and closing of the cartridge chamber door is provided. Therefore, when the light-shielding door of the film cartridge is in a non-light-shielding condition, even though a photographer tries to operate the holding member to open the cartridge chamber door, the holding member cannot be shifted to an allowed position for allowing the opening of the cartridge chamber door, so that the cartridge chamber door will not be opened.

DETAILED DESCRIPTION OF THE PREFERRED EMBODIMENTS

Embodiments of the present invention will be described hereinafter with reference to the accompanying drawings.

Figure 1:
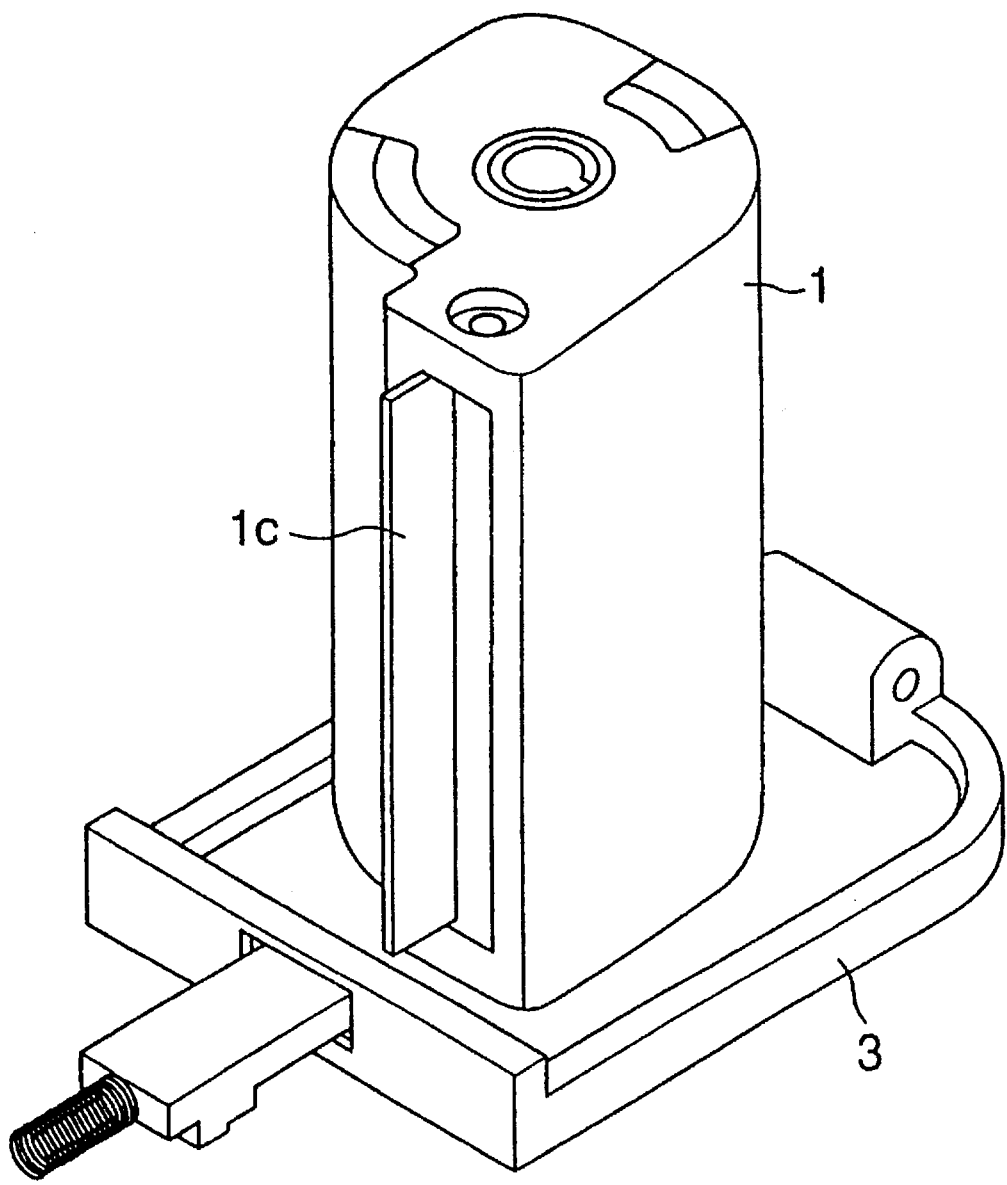
FIG. 1 is a perspective view of a conventional film cartridge with a light-shielding door.
Figure 2:
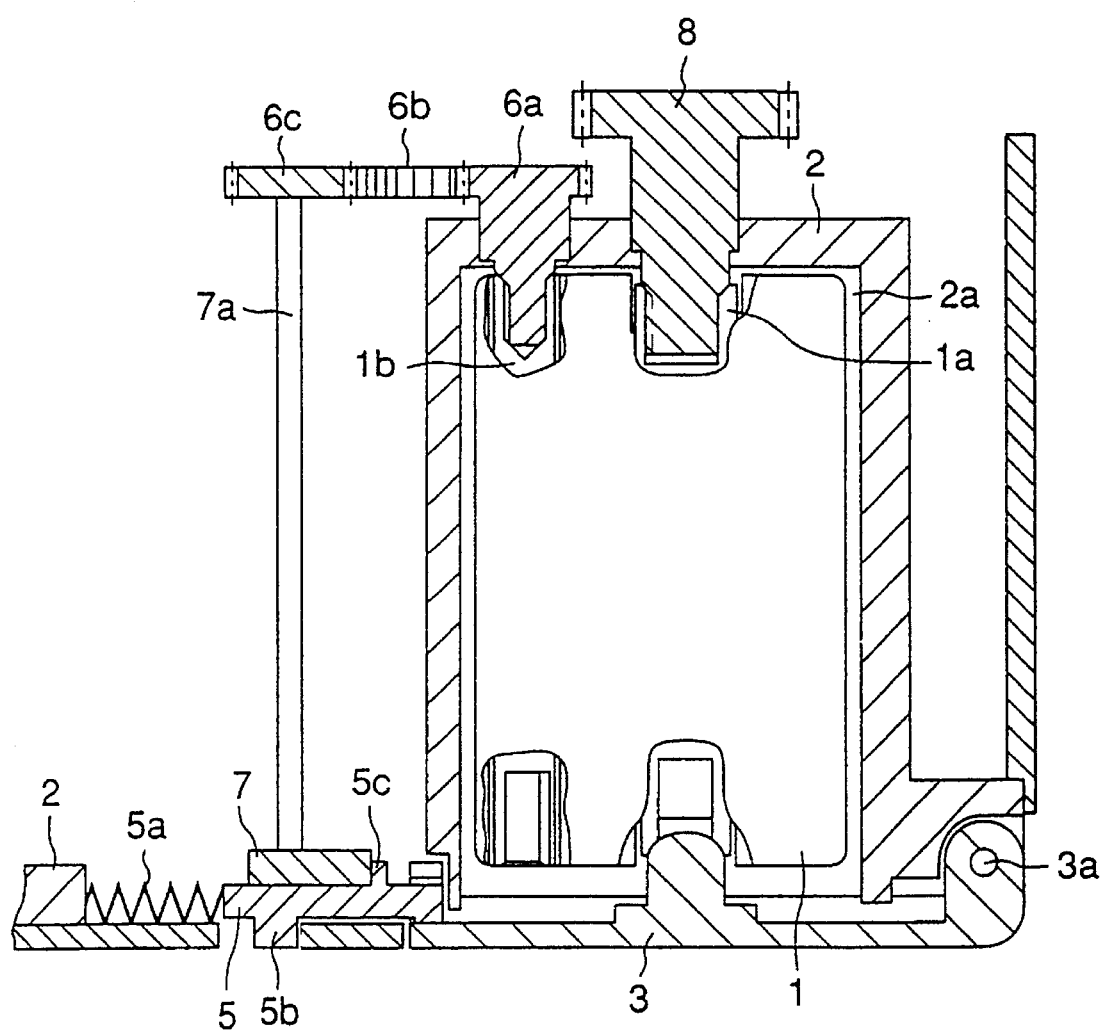
FIG. 2 is a cross section showing a first embodiment of the present invention.

FIG. 2 is a cross section showing a first embodiment of the present invention. In FIG. 2, a film cartridge 1 is loaded in a cartridge chamber 2a of a camera body 2. A film advancing fork 8 connected to a film advancing drive system (not shown) is engaged with a film shaft member 1a of the film cartridge 1. A light-shielding door opening and closing fork 6a engaged with a gear train 6b connected to a film winding and rewinding motor (not shown) is engaged with a light-shielding door opening and closing shaft 1b of the film cartridge 1. A fixing lever gear 6c engaged with the gear train 6b rotates a fixing lever 7 via a connecting shaft 7a.

A cartridge chamber door 3 rotates around a pivot 3a counterclockwise in the drawing. When the cartridge chamber door 3 is closed, an end 5f of a cartridge chamber door opening and closing lever 5 is fitted in a slot 3b formed in the cartridge chamber door 3 to prohibit the door 3 from being opened (in the counterclockwise direction in the drawing). The other end of the lever 5 is connected to the camera body 2 via a spring 5a and urged by the spring 5a toward the film cartridge 1.

Figure 3:
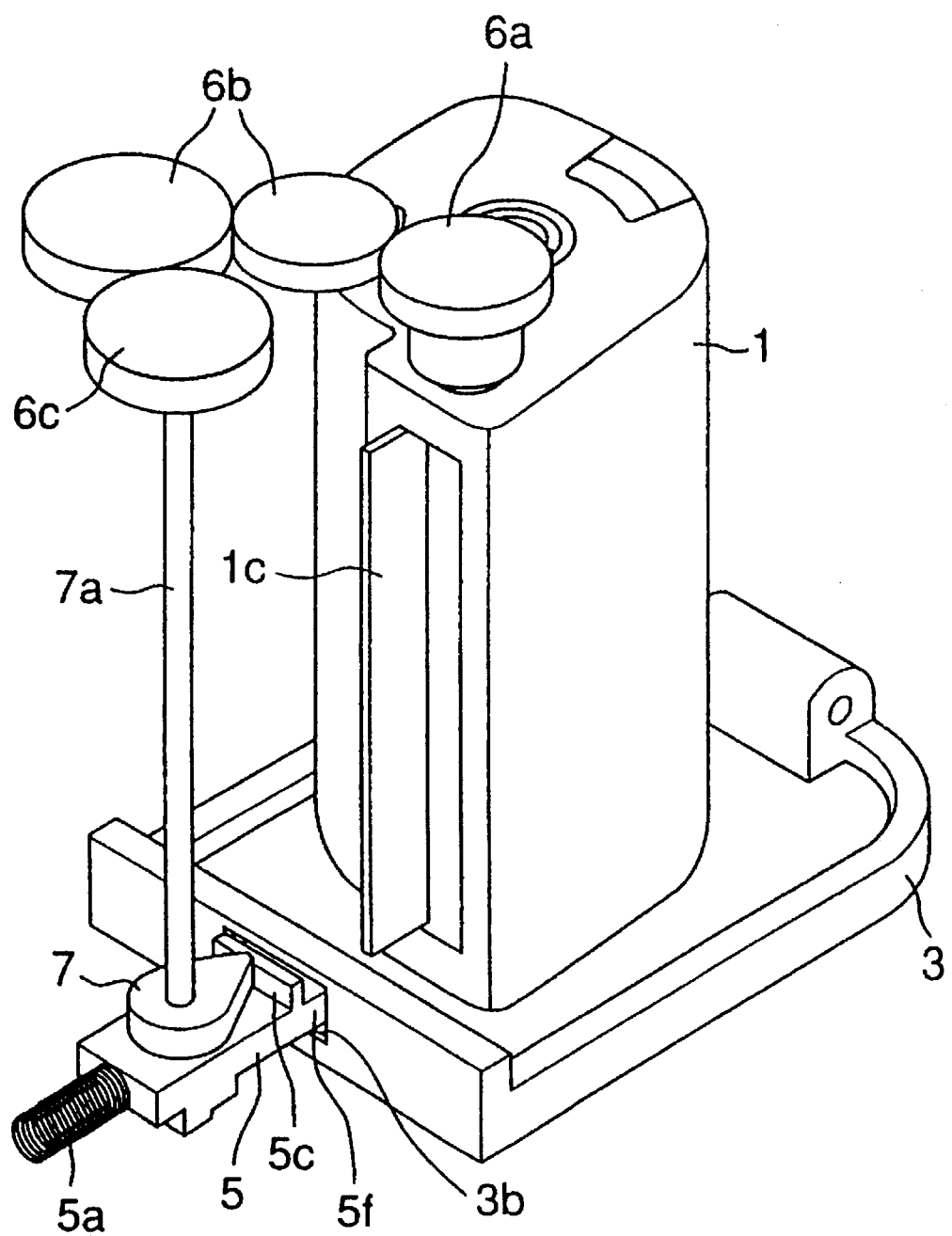
FIG. 3 is a perspective view showing the first embodiment, wherein the light-shielding door is opened.

FIG. 3 is a perspective view showing the first embodiment, wherein the light-shielding door 1c is opened. When the fork 6a engaged with the gear train 6b is rotated clockwise, the light-shielding door 1c interlocked with the light-shielding door opening and closing shaft 1b is opened, as shown in FIG. 3. Simultaneously, the fixing lever gear 6c engaged with the gear train 6b rotates counterclockwise to cause the cam-shaped fixing lever 7 to rotate counterclockwise via the connecting shaft 7a. As a result, the fixing lever 7 is brought into contact with a projection 5c formed on the cartridge chamber door opening and closing lever 5. Therefore, the cartridge chamber door opening and closing lever 5 is prevented from being withdrawn from the cartridge chamber door 3 thereby to prevent the opening of the cartridge chamber door 3.

Figure 4:
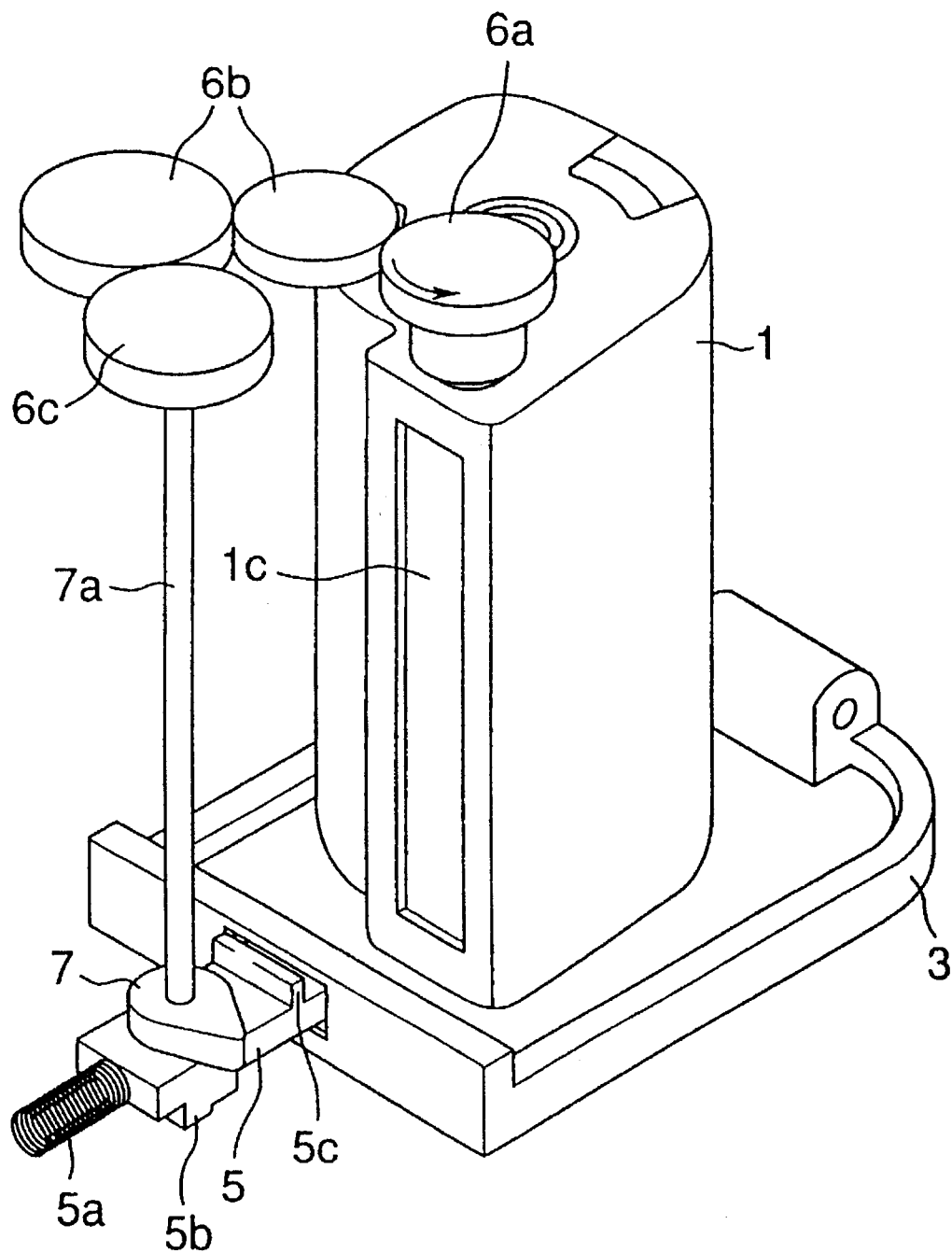
FIG. 4 is a perspective view showing the first embodiment, wherein the light-shielding door is closed.

FIG. 4 is a perspective view showing the first embodiment, wherein the light-shielding door 1c is closed. When the fork 6a engaged with the gear train 6b is rotated counterclockwise, the light-shielding door 1c interlocked with the light-shielding door opening and closing shaft 1b of the film cartridge 1 is closed, as shown in FIG. 4. Simultaneously, the fixing lever gear 6c engaged with the gear train 6b rotates clockwise to cause the cam-shaped fixing lever 7 to rotate clockwise via the connecting shaft 7a. As a result, the fixing lever 7 is detached from the projection 5c of the cartridge chamber door opening and closing lever 5, providing a space between the projection 5c and the fixing lever 7. Therefore, in the state of FIG. 4, a photographer can open the cartridge chamber door 3 by grasping a claw portion 5b of the cartridge chamber door opening and closing lever 5 with his or her fingers and sliding the lever 5 against the force of the spring 5a to disengage the cartridge chamber door opening and closing lever 5 from the cartridge chamber door 3.

Figure 5:
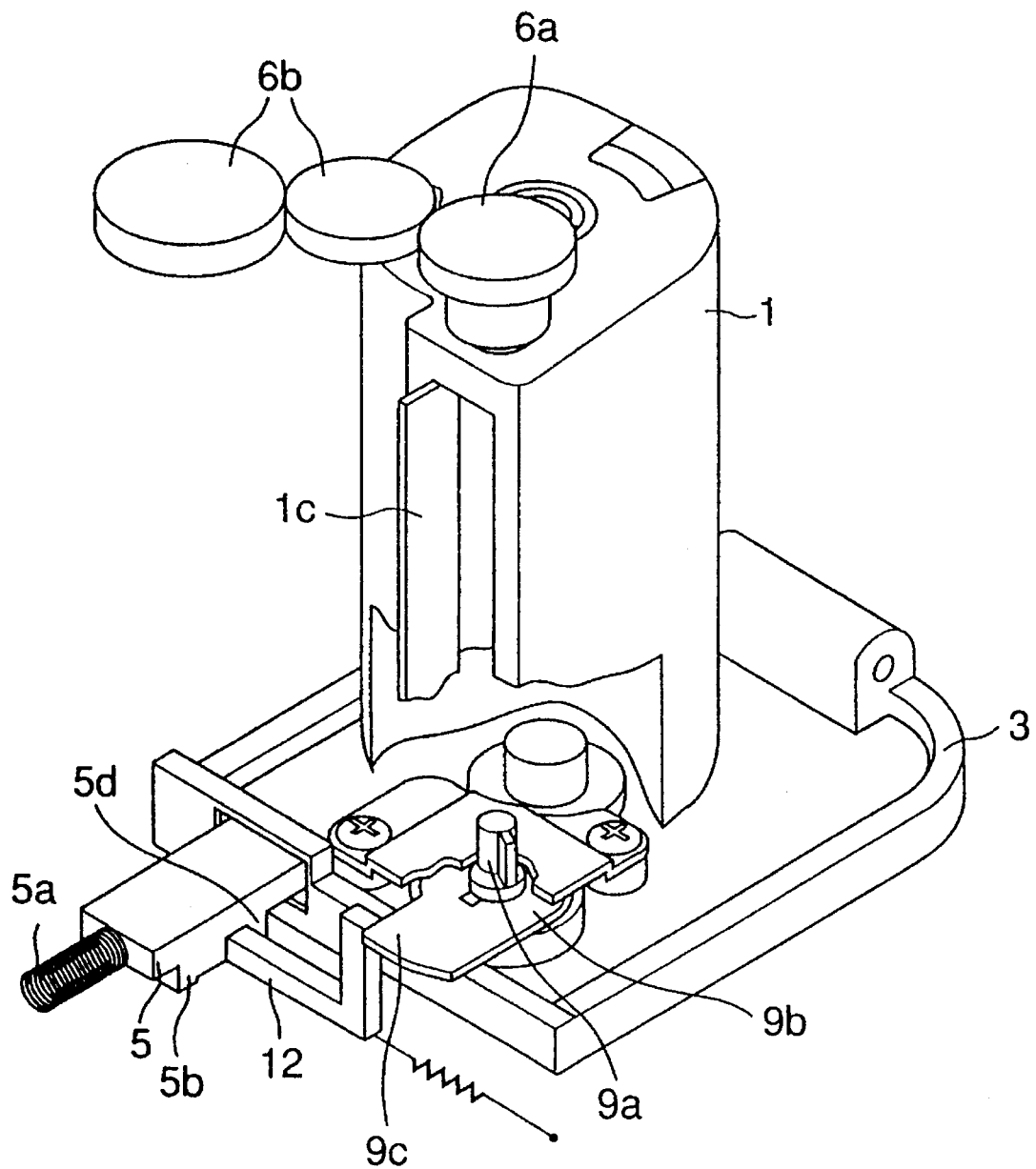
FIG. 5 is a perspective view showing a second embodiment of the present invention, wherein a light-shielding door is opened.

FIG. 5 is a perspective view showing a second embodiment of the present invention, wherein the light-shielding door 1c is opened. Elements identical to those in the first embodiment are designated by the like reference numerals. When the fork 6a engaged with the gear train 6b is rotated clockwise, the light-shielding door 1c interlocked with the light-shielding door opening and closing shaft 1b is opened, as shown in FIG. 5. In accordance with the movement of the light-shielding door 1c, a fixing lever fork 9a engaged with the light-shielding door opening and closing shaft 1b rotates clockwise. Consequently, a fixing lever 9b for rotating together with the fork 9a in the same phase rotates clockwise, so that an end portion 9c of the fixing lever 9b presses a fixing member 12 toward the cartridge chamber door opening and closing lever 5. Thereby, the fixing member 12 enters a groove of the opening and closing lever 5 formed between a projection 5d and the claw portion 5b. As a result, the cartridge chamber door opening and closing lever 5 is prevented from being withdrawn from the cartridge chamber door 3 thereby to prevent the opening of the cartridge chamber door 3.

Figure 6:
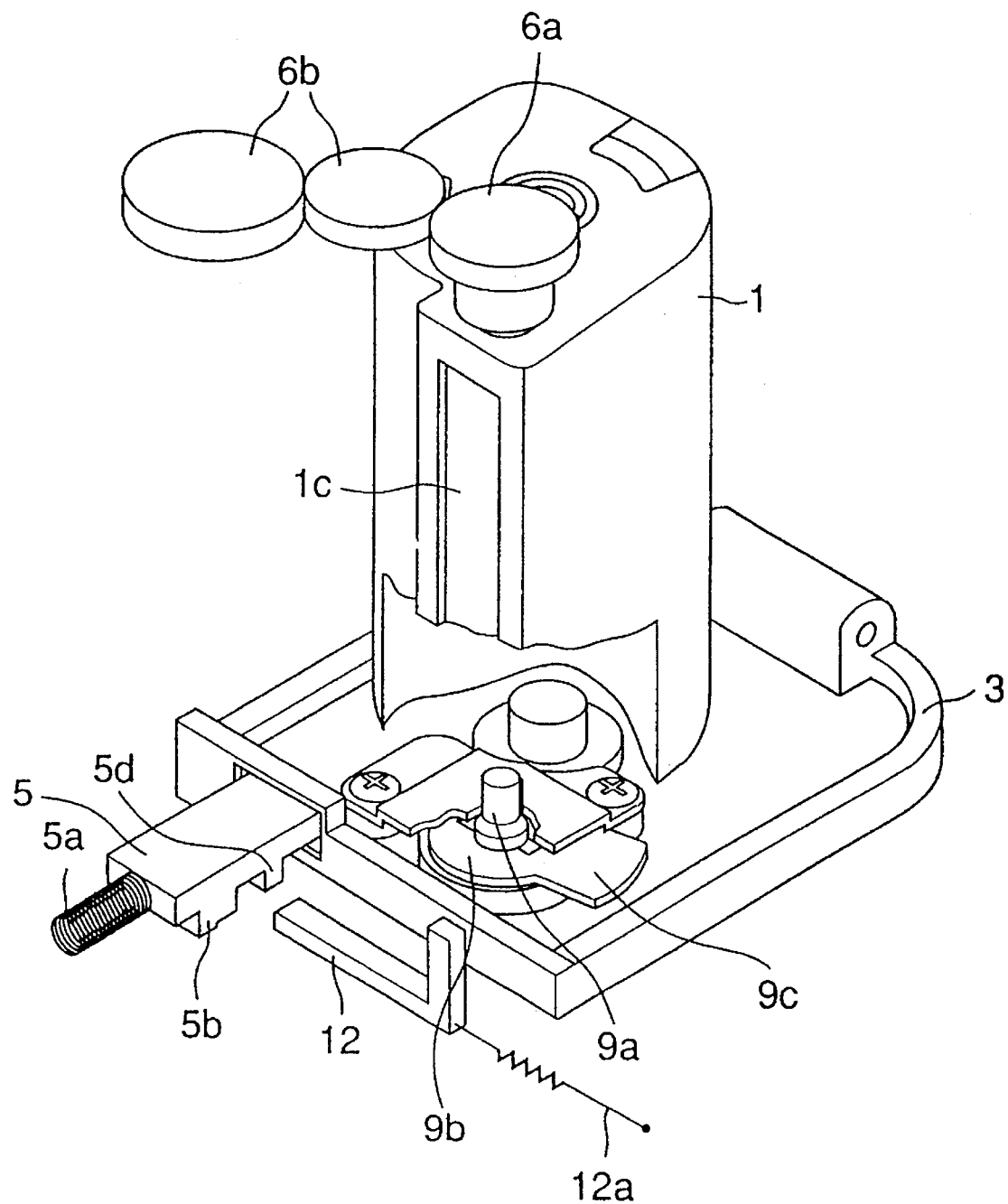
FIG. 6 is a perspective view showing the second embodiment, wherein the light-shielding door is closed.

FIG. 6 is a perspective view showing the second embodiment, wherein the light-shielding door 1c is closed. When the fork 6a engaged with the gear train 6b is rotated counterclockwise, the light-shielding door 1c interlocked with the light-shielding door opening and closing shaft 1b of the film cartridge 1 is closed, as shown in FIG. 6. In accordance with the movement of the light-shielding door 1c, the fixing lever fork 9a engaged with the light-shielding door opening and closing shaft 1b rotates counterclockwise. Accordingly, the fixing lever 9b rotates counterclockwise to cause its end 9c to be detached from the fixing member 12. Then, the fixing member 12 is detached from the groove between the projection 5d and the claw portion 5b of the opening and closing lever 5 due to a spring 12a connected to the camera body 2 and biased toward the camera body 2. Therefore, in the state of FIG. 6, the photographer can open the cartridge chamber door 3 by grasping the claw portion 5b of the cartridge chamber door opening and closing lever 5 with his or her fingers and sliding the lever 5 against the force of the spring 5a to disengage the cartridge chamber door opening and closing lever 5 from the cartridge chamber door 3.

Figure 7:
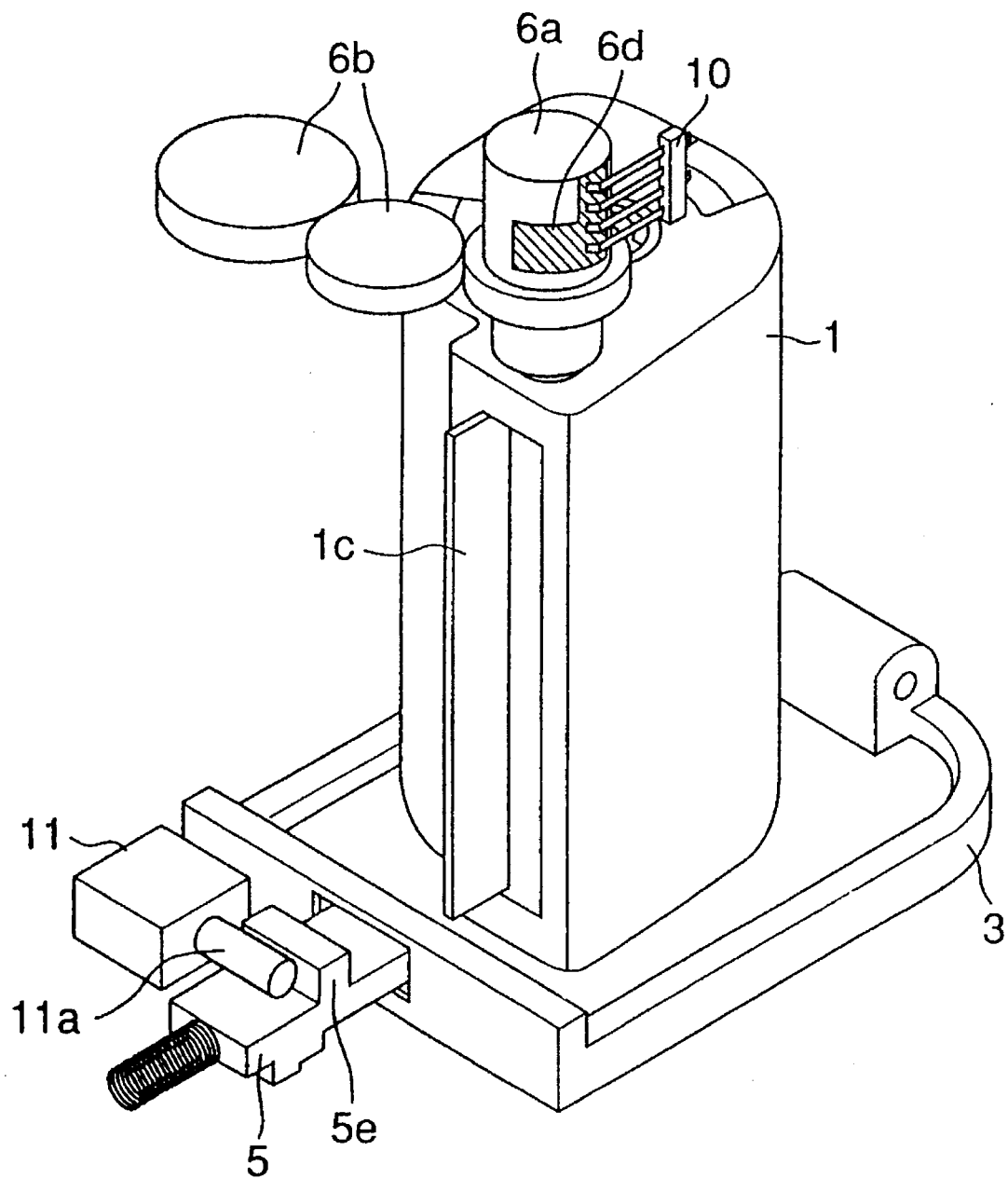
FIG. 7 is a perspective view showing a third embodiment of the present invention, wherein a light-shielding door is opened.

FIG. 7 is a perspective view showing a third embodiment of the present invention, wherein the light-shielding door 1c is opened. Elements identical to those of the first embodiment are designated by the like reference numerals. In FIG. 7, a switch pattern 6d is provided on the light-shielding door opening and closing fork 6a. The opening or closing of the light-shielding door 1c is detected by converting it into an electric signal by means of the switch pattern 6d and a switch 10. When the fork 6a engaged with the gear train 6b is rotated clockwise, the light-shielding door 1c interlocked with the light-shielding door opening and closing shaft 1b of the film cartridge 1 is opened. At this time, the opening of the light-shielding door 1c is recognized by a light-shielding door control circuit of a CPU (not shown) via the switch pattern 6d and the switch 10. Immediately thereafter, the light-shielding door control circuit projects a projection 11a of a plunger 11 provided next to the cartridge chamber door opening and closing lever 5. Thereby, the projection 11a of the plunger 11 fixes the projection 5e of the cartridge chamber door opening and closing lever 5, so that the cartridge chamber door opening and closing lever 5 is prevented from being withdrawn from the cartridge chamber door 3 thereby to prevent the opening of the cartridge chamber door 3.

Figure 8:
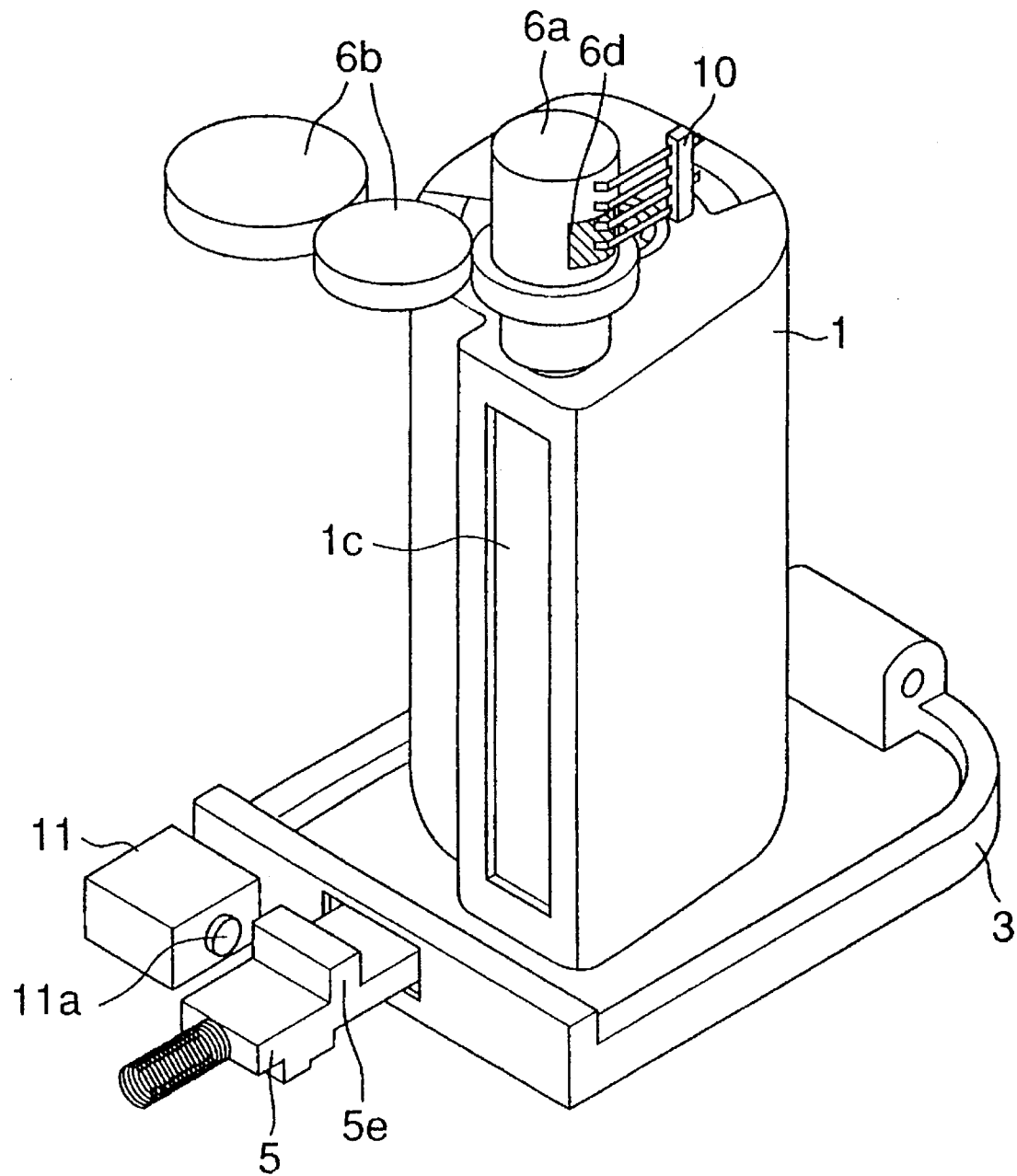
FIG. 8 is a perspective view showing the third embodiment, wherein the light-shielding door is closed.

FIG. 8 is a perspective view showing the third embodiment, wherein the light-shielding door 1c is closed. When the fork 6a engaged with the gear train 6b is rotated counterclockwise, the light-shielding door 1c interlocked with the light-shielding door opening and closing shaft 1b of the film cartridge 1 is closed, as shown in FIG. 8. At this time, the closing of the light-shielding door is recognized by the light-shielding door control circuit via the switch pattern 6d and the switch 10 provided on the light-shielding door opening and closing fork 6a. Then, the light-shielding door control circuit retracts the projection 11a of the plunger 11, making it possible to open the cartridge chamber door 3.

Figure 9:
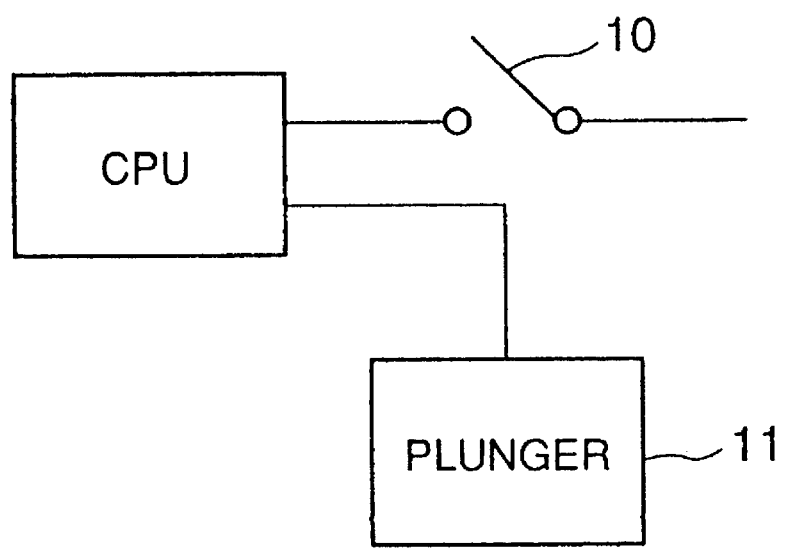
FIG. 9 is a block diagram showing the third embodiment.

FIG. 9 is a block diagram of the third embodiment. In FIG. 9, the CPU outputs a command for projecting the projection 11a of the plunger 11 when the switch 10 is turned on. Also, the CPU outputs a command for retracting the projection 11a of the plunger 11 when the switch 10 is turned off.

Figure 10:
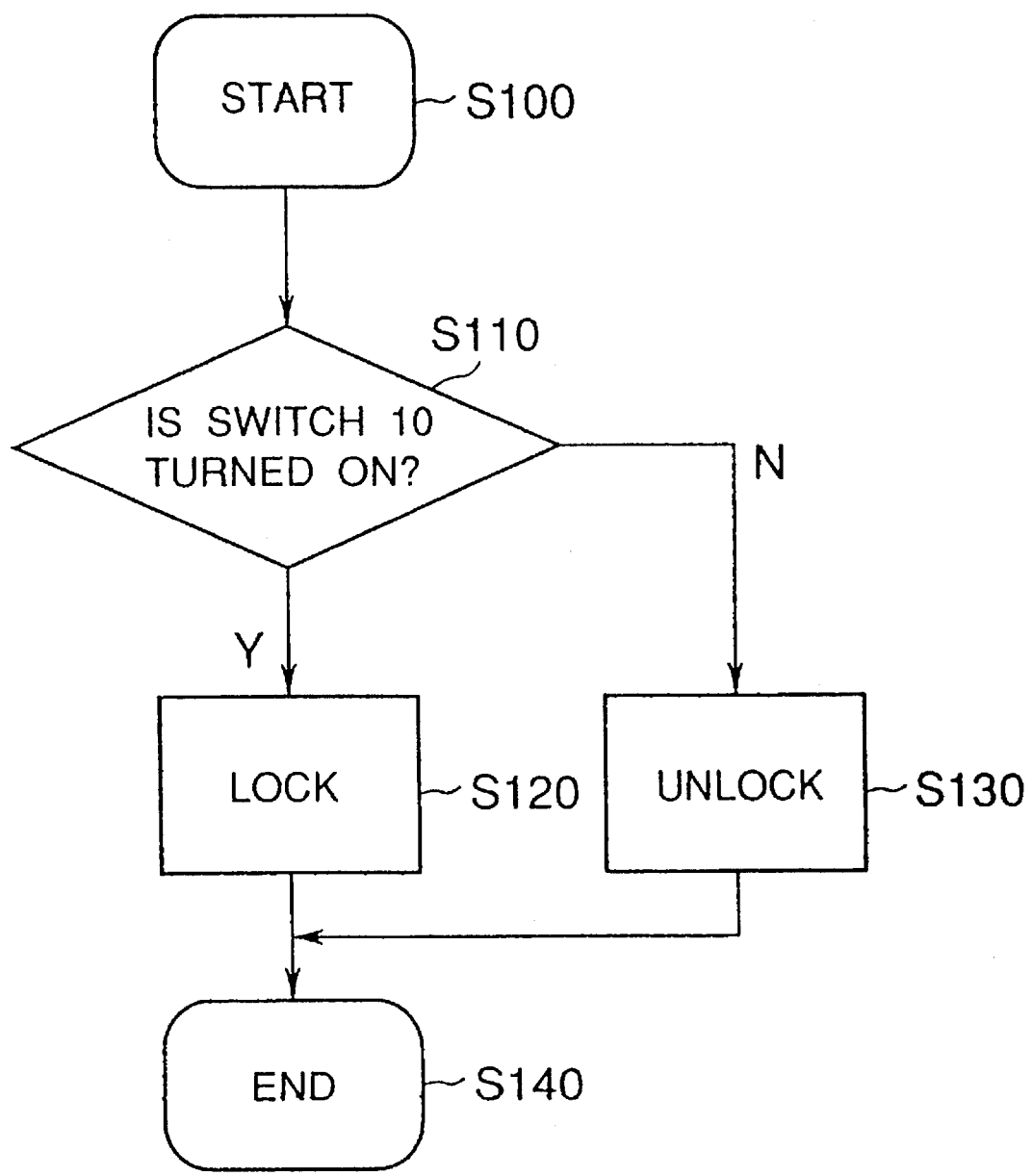
FIG. 10 is a flowchart showing the third embodiment.

FIG. 10 is a flowchart of the third embodiment. In the step S110, it is judged whether the switch 10 is on. When it is on, the procedure goes to the step S120, while when it is off, the procedure goes to the step S130. In the step S120, the projection 11a of the plunger 11 is projected to lock the projection 5c of the cartridge chamber door opening and closing lever 5. In the step S130, the projection 11a of the plunger 11 is retracted to unlock it.

Although the switch pattern 6d is provided on the light-shielding door opening and closing fork 6a to detect the opening or closing of the light-shielding door 1a in this embodiment, the method and means for converting the opening or closing of the light-shielding door into an electric signal and detecting it are not limited to the above and other methods and means can be adopted. Also, without fixing the projection 5e of the cartridge chamber door opening and closing lever 5 directly by means of the projection 11a of the plunger 11, an operating member coupled to the projection 11a of the plunger 11 may fix the projection 5e of the cartridge chamber door opening and closing lever 5.

Further, instead of the plunger, a motor may be utilized to project or retract the projection 11a.

Figure 11:
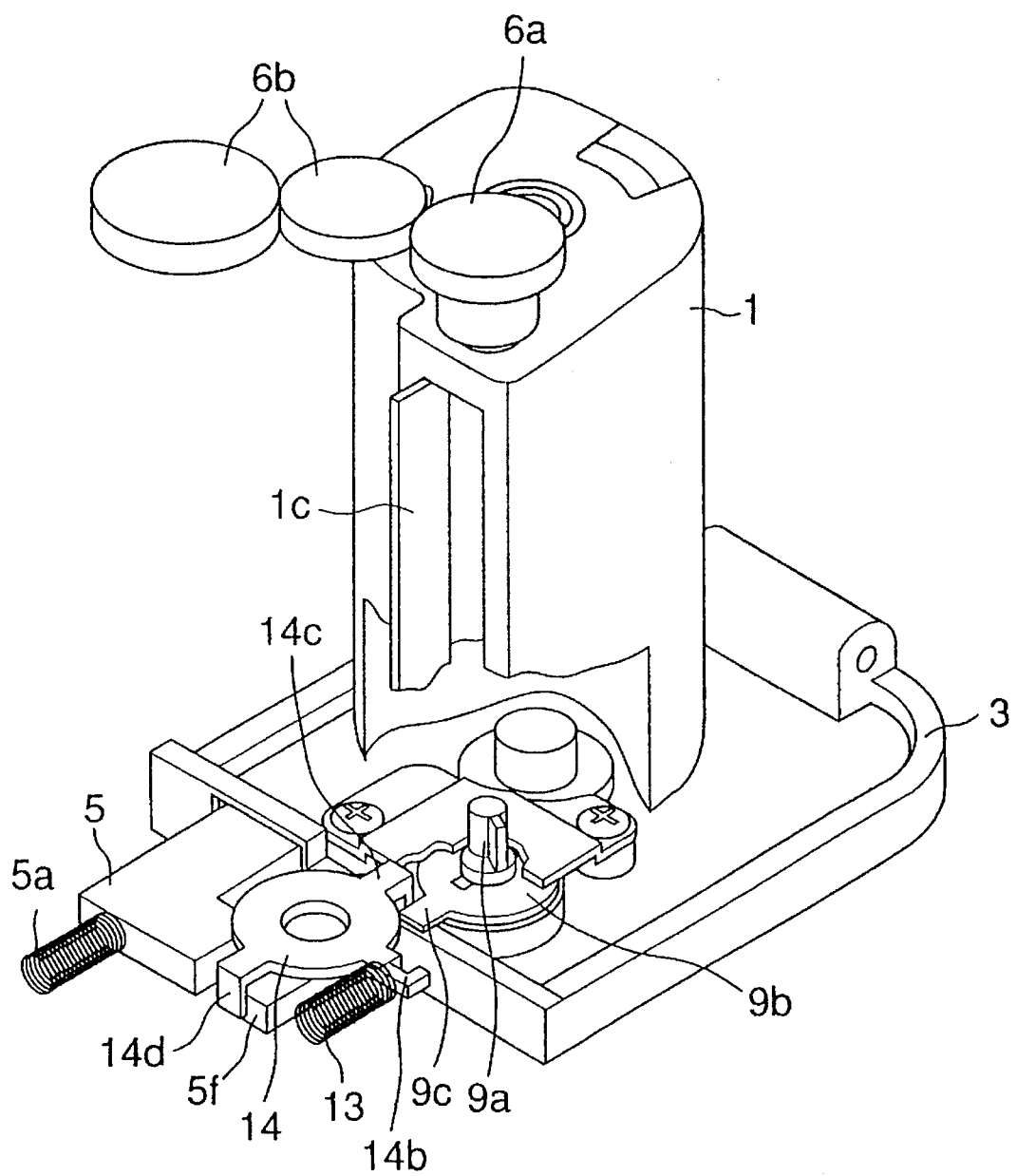
FIG. 11 is a perspective view showing a fourth embodiment of the present invention, wherein a light-shielding door is opened.

FIG. 11 is a perspective view showing a fourth embodiment of the present invention, wherein the light-shielding door 1c is opened. Elements identical to those of the first embodiment are designated by the like reference numerals. In FIG. 11, a cartridge fixing member 14 is engaged rotatably with a boss portion (not shown). An end of a spring 13 is connected to the camera body 2, while the other end thereof is connected to a spring connecting portion 14d. The cartridge fixing member 14 is urged by the spring 13 so as to rotate clockwise.

When the fork 6a engaged with the gear train 6b connected to the film winding and rewinding motor (not shown) is rotated clockwise, the light-shielding door 1c interlocked with the light-shielding door opening and closing shaft 1b of the film cartridge 1 is opened. As the light-shielding door 1c is opened, the fixing lever fork 9a engaged with the light-shielding door opening and closing shaft 1b rotates clockwise. Accordingly, the fixing lever 9b for rotating together with the fork 9a in the same phase rotates clockwise, so that the end portion 9c of the fixing lever 9b is brought into contact with an arm portion 14c of the cartridge fixing member 14 and the cartridge fixing member 14 is rotated counterclockwise. As a result, an L-shaped fixing portion 14d of the cartridge fixing member 14 is brought into contact with a fixing surface 5f of the cartridge chamber door opening and closing lever 5. Therefore, the cartridge chamber door opening and closing lever 5 is prevented from being withdrawn from the cartridge chamber door 3 thereby to prevent the opening of the cartridge chamber door 3.

Figure 12:
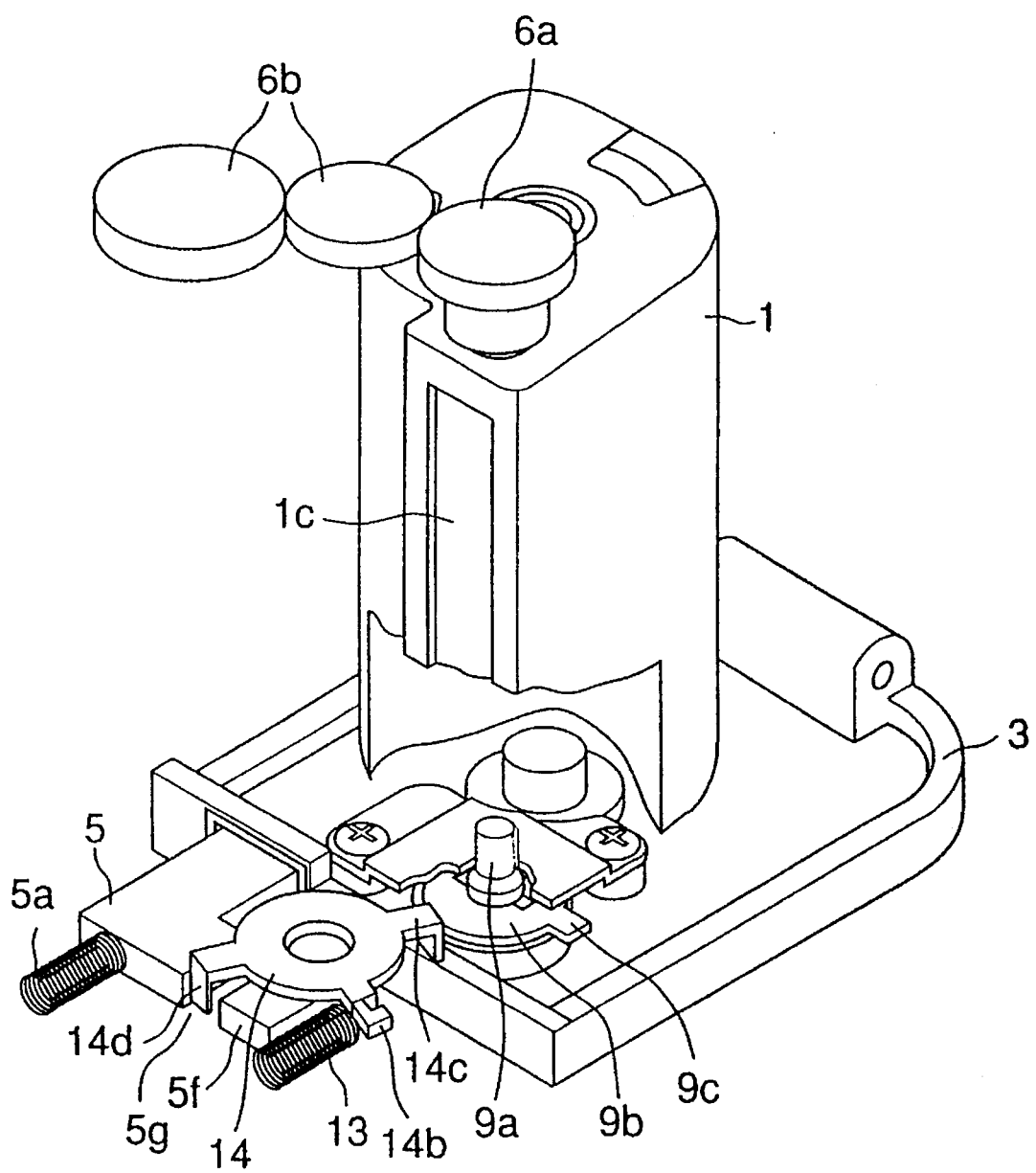
FIG. 12 is a perspective view showing the fourth embodiment, wherein the light-shielding door is closed.

FIG. 12 is a perspective view showing the fourth embodiment, wherein the light-shielding door 1a is closed. When the fork 6a engaged with the gear train 6b is rotated counterclockwise, the light-shielding door 1c interlocked with the light-shielding door opening and closing shaft 1b of the film cartridge 1 is closed, as shown in FIG. 12. As the light-shielding door 1c is closed, the fixing lever fork 9a engaged with the light-shielding opening and closing shaft 1b is rotated counterclockwise. Simultaneously, the fixing lever 9b for rotating together with the fixing lever fork 9a in the same phase rotates counterclockwise to cause the end portion 9c of the fixing lever 9b to be detached from the arm portion 14c of the cartridge fixing member 14. The cartridge fixing member 14 rotates clockwise due to the force of the spring 13, so that the L-shaped fixing portion 14d of the cartridge fixing member 14 is disposed in an escape portion 5g. Therefore, in the state of FIG. 12, the photographer can open the cartridge chamber door 3 by sliding the cartridge chamber door opening and closing lever 5 against the force of the spring 5a to disengage the lever 5 from the cartridge chamber door 3.

In the present invention, a limiting member for limiting movement of a holding member for limiting the opening and closing of the cartridge chamber door is provided. Therefore, when the light-shielding door of the film cartridge is in a non-light-shielding condition, even though the photographer tries to operate the holding member to open the cartridge chamber door, the holding member cannot be shifted to an allowed position for allowing the opening of the cartridge chamber door, so that the cartridge chamber door will not be opened. That is, the photographic film will not be exposed carelessly.

What is claimed is:

1. A lock device of a camera having a camera body using a film cartridge having a light-shielding door shiftable between a light-shielding condition for shielding light to a photographic film in said film cartridge and a non-light-shielding condition for enabling said photographic film to be withdrawn from said film cartridge, said lock device comprising:

a cartridge chamber having an opening portion through which said film cartridge is loaded in said cartridge chamber;

a cartridge chamber door being disposed in a shielding position for shielding said opening portion of said cartridge chamber when said light-shielding door of said film cartridge is at least in the non-light-shielding condition;

a holding member, slidably supported by said camera body and having a projection, shiftable between a prohibited position for prohibiting movement of said cartridge chamber door from said shielding position and an allowed position for allowing movement of said cartridge chamber door from said shielding position; and a limiting member contactable with said projection for limiting movement of said holding member from said prohibited position to said allowed position.

2. A lock device according to claim 1, wherein said limiting member is driven in accordance with drive of said light-shielding door of said film cartridge.

3. A lock device according to claim 1, wherein said limiting member includes a detection device for generating an electric signal indicating that said light-shielding door of said film cartridge is in the light-shielding condition or in the non-light-shielding condition, said limiting member being driven in accordance with said electric signal of said detection device.

4. A camera having a camera body comprising:

a cartridge chamber for accommodating a film cartridge, said cartridge chamber having an opening portion through which said film cartridge is accommodated or taken out from said cartridge chamber, said film cartridge having a light-shielding door shiftable between a closed position in which an opening of said film cartridge for pulling in or out a photographic film and an opened position in which said opening of said film cartridge is opened to allow said photographic film to be pulled in and out;

a drive device for opening and closing said light-shielding door of said film cartridge accommodated in said cartridge chamber;

a cartridge chamber door for closing said opening portion of said cartridge chamber; and a lock device being interlocked with said drive device for prohibiting said cartridge chamber door from being opened when said light-shielding door of said film cartridge is disposed in said opened position, and allowing said cartridge chamber door to be opened when said light-shielding door of said film cartridge is disposed in said closed position, comprising a holding member, slidably supported by said camera body and having a projection, and a limiting member contactable with said projection.

5. A camera according to claim 4, wherein said lock device comprises:

a holding member being engageable with said cartridge chamber door and shiftable between a prohibited position for prohibiting said cartridge chamber door from being opened and an allowed position for allowing said cartridge chamber door to be opened; and a limiting member being interlocked with said drive device for limiting movement of said holding member from said prohibited position to said allowed position when said light-shielding door of said film cartridge is disposed in said opened position.

* * * * *